United States Patent
Thuillier

[15] 3,676,551
[45] July 11, 1972

[54] PROCESS FOR OBTAINING EXTRACTS FROM ANIMAL TISSUES

[72] Inventor: Yvonne Thuillier, Paris, France
[73] Assignee: Laboratories Albert Rolland, Paris, France
[22] Filed: Oct. 3, 1969
[21] Appl. No.: 863,696

Related U.S. Application Data

[63] Continuation-in-part of Ser. No. 530,325, Feb. 28, 1966, which is a continuation-in-part of Ser. No. 247,827, Dec. 28, 1962, abandoned.

[30] Foreign Application Priority Data

Jan. 19, 1962 France..................................62885273

[52] U.S. Cl..................................424/103, 424/106, 424/95
[51] Int. Cl. ......................................................A61k 17/00
[58] Field of Search..................................424/103, 106, 110

Primary Examiner—Richard L. Huff
Attorney—Hane & Baxley

[57] ABSTRACT

Extracts of animal organs, useful in opotherapy, are prepared by removing from the organ aseptically collected immediately after slaughtering the animal, foreign matter, debris and fat. The remainder is then very rapidly frozen to about a temperature of $-78°$ C. and maintained at a temperature of about $-20°$ C. Thereupon, the organ is crushed at a temperature of about $2°$ C. and subjected to moderate digestion at room temperature by activated trypsin. By removing insoluble matter a clear solution is obtained. Euglobulins present in the solution are removed by affixing on an insoluble sulfate which is thereupon removed and the resulting solution is clarified. Finally, the clarified solution is rapidly freeze-dried at a temperature of about $-80°$ C.

9 Claims, No Drawings

PROCESS FOR OBTAINING EXTRACTS FROM ANIMAL TISSUES

This application is a continuation-in-part application of my copending application Ser. No. 530,325 filed Feb. 28, 1966 entitled Process For Obtaining Extracts From Animal Tissues, which in turn is a continuation-in-part application of my earlier filed application Ser. No. 247,827 filed Dec. 28, 1962 entitled Process For Obtaining Extracts From Living Tissues, which is now abandoned.

This invention relates to organ preparations and is particularly directed towards a new and improved process for preserving the active principles contained in tissue from animal organs, and for making them anallergic for physiological and therapeutic purposes.

BACKGROUND

The prior products were characterized by notable deficiencies, due to the degrading effects of the methods used in the preparation thereof. Those prior methods resulted in modification or even elimination of essential components of the active principles contained in the starting materials, essentially due to the following:

1. autolysis of the material;
2. the use of aqueous-alcoholic, alcoholic, acetonic and similar vehicles, as well as heating in acidic media for precipitating the proteins;
3. tyndallization (heating at 70° C. for three days) or autoclaving (heating for one hour at 120° C.) to sterilize the product;
4. preservation in an aqueous medium, as a consequence of which the active principles underwent degradation or modification.

Furthermore, there is no doubt that substances are produced by each tissue of a normal organism, some of which are known, whilst others are still unknown, the metabolic activity of each substance depending on the constitution of the tissues, so that it is in fact impossible to identify precisely in general the active principles of an opotherapic extract. Thuillier, "Active principles of the hepatic gland and their functional relations - General interest of hepatotherapy", published in PRAXIS, No. 31, Aug. 1, 1957, pages 676–681).

It is thus essential that the composition of these complete opotherapic extracts be similar to the composition of the fresh organ, and that during their preparation these extracts undergo the least possible degradation.

Another essential problem in the manufacture of products containing active principles of animal organs, intended for injection, is the sufficient elimination of specific heterogeneous proteins, equally contained in the starting material. When specific proteins of an animal or a determined organ are injected into the human organis, detrimental phenomena arise, such as anaphylactic shocks and seroreactions, e.g. urticaria and allergy. The presence of these proteins in products obtained by the above-described methods thus renders the useful application of the thus preserved active principles impossible.

THE INVENTION

The instant invention overcomes the aforesaid disadvantages of the conventional methods by keeping the active principles of the organs or glands retained in their natural physiological equilibrium.

The basic operations involved in producing the products of this invention are the following:

1. Quick freezing to about −78° C. of the organs or glands under sterile conditions immediately after aseptic removal thereof from the freshly slaughtered animal.
2. Effecting a digestion with elimination of the antigenic activity of the material so as to render same non-allergenic.
3. Freeze-drying of the material rendered nonallergenic.

All process steps described hereinbefore are carried out under sterile conditions, thereby avoiding the necessity for subsequent sterilization of the final organ preparation.

By means of the process according to the invention the integrity of the cellular content of active principles is maintained in its natural physiological equilibrium, which is achieved more particularly by the stabilizing action of cold, the temperatures which are maintained during each step of the preparation.

Moreover, the process according to the invention is to be carried out under the following conditions:

the cells of the organs used are still living (from a biological point of view), and no dead or mortified organs are employed. The organs are taken aseptically from selected young animals (e.g. from steers which are less than two years old);

during preparation the use of heat is avoided and the addition of particular solvents or other substances which are capable of destroying certain active principles is also avoided. Thus, during the entire process the prevailing temperature never exceeds room temperature;

preservation is obtained by freeze-drying. The activitiy of the fragile cellular constituents which had been successfully protected from a loss up to this stage is thereby preserved.

Furthermore, it is the object of the present process to obtain complete extracts whose content of therapeutically active elements corresponds to the one of the starting material, as regards their nature and their proportions, which extracts, moreover, do not show any antigenic action, so that they may be injected in humans without danger.

The process of the invention is based on the following experimental findings: the antigen contained in the pseudo-globulins and euglobulins is completely adsorbed by barium or calcium sulfate. The pseudo-globulins and euglobulins are freed from the mass by means of a moderate cleavage of the protein. The antigenic power is thus eliminated by means of adsorption on barium sulfate.

Theoretically, the advantageous results of the novel process according to the invention are in conformity with recent discoveries made during physico-chemical studies on enzymes (Heidelberger, "Contribution of immuno-chemistry to the study of biological structures", published in Bulletin de la Societe de Chimie Biologique, 1964, volume 46, No. 11, pages 1293–1298), according to which it is possible to maintain the enzymatic activity of proteic elements when their immunologic activities are different. In proceeding with special caution it is thus possible to preserve the fraction of the active principle of the protein which is of interest, and simultaneously to eliminate the antigenic site.

FLOW DIAGRAM OF THE PROCESS ACCORDING TO THE INVENTION

Starting material: Organ or gland removed aseptically promptly after slaughter

Quick freezing to −78° C.;

Transport to laboratory in refrigerated containers held at −20° C.,

Mechanical crushing;

Crushings digested at ambient temperature by the action of trypsin, activated with calcium ions, and clarified;

pH of clarified liquid reduced to pH 3.7 with $H_2SO_4$;

pH raised to pH 9 by addition of $Ba(OH)_2$ or $Ca(OH)_2$ resulting in precipitation of insoluble sulphate with euglobulin affixed thereto;

Precipitate removed and liquid clarified;

pH of liquid reduced to pH 3.7, and clarified;

Liquid quickly frozen to −80° C.;

Freeze-dried, plate temperature − 80° C.; and under a Vacuum of $10^{-4}$ mm. Hg.

Final product.

The process of the invention is applicable to the preparation and preservation of physiologically active materials from tissue obtained from any kind of animals. Preferably, mammals such as pigs, sheep and bovine animals or their fetuses in the later stages of development are used.

Hereinafter, the term "tissue from animal organs" is meant to cover the cell tissue proper which is obtained from the organs of animals, including fetuses, as well as preparations obtained from animal body fluids.

Animal organs which may be used include liver, kidney, pancreas and heart.

The tissue of animal organs is collected aseptically at the time of slaughtering, and is freed from foreign portions and various debris (fat) and frozen very quickly to a low temperature, preferably about −78° C., this being done in order to avoid any autolysis or fermentation phenomena. The constituents of the cell are thus preserved without degradation.

The organs are crushed in a mechanical crusher in order to obtain a maximum surface effect and to simultaneously free the cellular content.

The crushed material is rendered anallergic in two stages:
a. moderate cleavage of the proteins by activated trypsin; specific euglobulins are left in the mass;
b. fixation of euglobulins on an insoluble sulfate.

After the cleavage by calcium-activated trypsin, the pH of the extract is lowered to 3.7 with sulfuric acid and then brought to 9 by the addition of barium or calcium hydroxide, at a temperature not exceeding room temperature. The fluid mass is stirred to cause complete precipitation of the insoluble sulfate which carries down with it the euglobulins which have been adsorbed thereon.

After complete precipitation of the sulfate with the euglobulins adsorbed thereon, and removal of the precipitate, the residual solution is freeze-dried.

The ampoules containing the material are frozen in a drying chamber, cooled to −80° C. (the freezing point of the material being within the range of from −10° to −15° C.).

During the drying step under reduced pressure the temperature of the plate is kept at −70° to −80°C., and the temperature of the cold condenser is maintained within the range of from −90° to −100° C. The pressure of the order of $10^{-4}$ mm. Hg.

The freeze-dried product obtained is a powder, which can be dissolved in apyrogenic distilled water to form an injectable solution.

The above-described process of the present invention is set forth in specific illustrative embodiments in the following Examples:

First Example:

LIVER EXTRACT a. First operation:
Aseptic separation with quick freezing.
Two fresh livers, the total net weight being of the order of 12 kg were used as starting material. Each liver was selected as to its origin and quality. The livers of twoyear old steers which had been kept on grazing ground were preferred.
The livers were collected aseptically and all subsequent operations were effected under sterile conditions. Sudden freezing to −78° C. was effected after slaughtering, and the properties of the hepatic gland were thus preserved.
No dead or mortified tissues were used, only living tissues.
Transport to the laboratory in refrigerated containers kept at −20° C.

b. Second operation:
Mechanical crushing.
Just before crushing, the livers were thawed in their containers by subjecting the containers to a temperature of +2° C. for 12 hours, whereafter, still under sterile conditions, they were put through the crusher. The crushed organs were collected.
Cleavage of protein molecules.
Sterile limewater was added to the crushed organs. The pH value was adjusted to about 8 by adding 1 N NaOH with prolonged stirring. Then trypsin solution, sterilized on an $EKS_2$ sterilizing filter, in a ratio of 3 parts of pure trypsin to 100 parts by weight of fresh liver, was added, and the mixture kept for 5 hours at ambient temperature to effect digestion which was considered to be terminated when the pH reached a value of about 4.6–4.7. The solution was filtered, e.g. over a nylon cloth and then clarified in a centrifuging apparatus. The solution was kept overnight at −5° C.

Elimination of antigenic globulins.
The solution was acidified by adding sulphuric acid at a dilution ratio of one-seventh by weight, until the pH reached 3.9.
The pure barium hydroxide was added until the pH reached 9. An abundant precipitate formed.
After standing for at least one hour the suspension was centrifuged until a perfectly clear liquid was obtained. If necessary, the liquid may be filtered over $C_2$. The pH was then adjusted to be 3.7. The liquid was again centrifuged and further clarified by filtration. The absence of barium was checked by using sulphuric acid at a dilution ratio of one-seventh by weight on a fraction of the liquid. The dry extract should be controlled and should amount to 10 percent of the liquid. The solution, which should have a pH value of from 4.2 to 4.5 was filled into sterile ampoules, each containing 2.5 ml of said solution.

c. Third operation.
The ampoules were frozen in a sterile drying chamber, cooled to −80° C. (Freezing point of the product within the range −10° to −15°C.). Rapid freezing was essential (a few seconds only).
Drying took place in a drying chamber provided with glass windows, which was cooled by circulation of alcohol and PRSON-13. Temperature of the plates was maintained within the range of from −70° to −80° C., and that of the cold condenser within the range of from −90° to −100° C. The use of said condenser and of a blade-type rotary pump permitted the vacuum to reach an order of about $10^{-4}$ mm. Mg.
Towards the end, the operation was carried out in an inert atmosphere (nitrogen) to avoid any oxidation.
During the freeze-drying step the product never reached a temperature exceeding 0° C.

To show the metabolic activity of the extract, cellular oxidations were studied in the WARBURG apparatus. Only by using the product prepared by the process according to the present invention was it possible to clearly improve the oxidative metabolism under the experimental conditions such as described in PRAXIS 53, No. 44, 1964, pages 1477–1482.

In therapy, the activity of the liver extract obtained according to the invention was determined as follows:

Good results were obtained with several hundred patients having the following conditions, to whom the product was administered at dosages shown below by means of intramuscular injections or slow perfusions:

| | |
|---|---|
| Icterus gravis | 1 Ampoule containing 250 mg for 20–30 days |
| Aggravated catarrhal jaundice catarrhal jaundice benign cases of toxic or infectious jaundice steatosis | 1 Ampoule of 50 mg per day for 30 days |

"Liver extracts according to the invention have been administered to new born babies suffering from serious nonimmunilogical jaundice. For all the children treated, the bilirubinemy has been accelerated by utilization of liver extracts according to the invention. Exsanguino-transfusion currently made previously for the treatment of said jaundices has now become exceptional due to the treatment with these liver extracts".

A statistical survey on the total bilirubine rate has shown that after elimination of the additive detrimental fluctuations, the reduction in the bilirubine rate was actually connected to the treatment. The numerous medical publications published on this subject have been fully confirmed by the utilization of said treatment in more than two thousand cases.

In practice, use was preferably made of the product in the form of a solution which can be injected and which has, for example the following formula, given for one ampoule :

Liver extract . . . . . . . . . . . 250 mg
Solvent (at time of use) . . . . . . 10 ml.

The solvent used is apyrogenic distilled water.

Second Example :

KIDNEY EXTRACT a. First operation.

Aseptic separation with quick freezing.

The starting material was 90 hog kidneys, the total weight being about 12 kg. After sudden freezing to −78° C. the kidney batch, collected under sterile conditions, was put into a container, which was transported to the laboratory in refrigerators at −20° C.

b. Second operation (carried out under sterile conditions).

Mechanical crushing

The kidneys after being freed from fat, the pelvis renalia and ureters were cut and passed through a crusher.

Cleavage of protein molecules was carried out substantially as described for the liver preparation above.

The pure trypsin was added at a ratio of 6 percent by weight of the fresh kidneys and the digestion was stopped when the pH reached between about 5 and 5.2.

The remaining steps were carried out substantially in the same manner as described for the liver except that in elimination of the euglobulin, sulfuric acid was added until the pH reached about 3.7.

Biological study of the activity of the kidney extract.

Quantitative analysis of the free and combined aminosoids in the preparation shows that its composition is very close to that of the fresh organ.

This is a criterion of the effectiveness of the process.

By the application of said process to the kidney I obtained a product which was very useful in human therapeutics, the main properties of which will be described hereinafter.

Pharmacodynamic and clinical studies of the properties and the effectiveness of the product, which is a yellow powder, were carried out, the essential results of which are summarized hereunder :

Pharmacodynamic study :

Tests were made with various animals : rats, guinea pigs, and rabbits, and proof was thus obtained of :

1. the absence of acute toxicity, a good tolerance of the product when injected at a daily dose of 1g/kg for three months,
2. the product brings to normal values the exchangeable sodium in animals having experimental nephropathy by eliminating the sodium retention and consequently causing regression of pathological effusions (checked with isotope $Na^{22}$),
3. an improvement in the elimination of urea after overloading.

In practice, the product is administered by injection. An ampoule for injection may contain :

Kidney extract . . . . . . . . . . . 150 mg,
Solvent (at time of use) . . . . . . . 5 cc.

The solvent used is apyrogenic distilled water. Dosage :

A treatment with kidney extract should be started as soon as possible and the dosages administered from the very beginning should be sufficiently high in order to cause an appreciable improvement.

On the average, two ampoules should be administered daily in one or two injections. However, since the tolerance of the product is excellent, it is possible to administer four ampoules per day or even more. The treatment should be continued for 2 to 3 weeks.

It might prove necessary in certain cases to proceed to an after-cure, during which lower doses will be given (1–2 ampoules per day for 2 weeks). No. contra-indication.

To children, the product should be administered as follows :
1 ampoule per day for 15 to 20 days. Intramuscular injection.

Third Example.

HEART EXTRACT.

The starting material is 10–12 kg of calves' hearts. Sudden freezing to −78° C. is effected after slaughtering. Each batch of hearts, collected under sterile conditions, is transported to the laboratory in refrigerated containers held at −20° C.

The remaining operations are carried out according to the flow diagram and described for the preparation of the liver extract.

A study of cellular oxidation of the extract was effected in the Warburg apparatus (manometric measurements). It was ascertained that this extract increases the consumption of $O_2$, causes an increase of the anaerobic glycolysis, alkaline phosphatase and myocardial glycogenesis. Pharmacodynamic study.

A study was made of the action of the extract on the cardiac rhythm.

An isolated rabbit's heart was used, held under continuous perfusion by means of a LOOKE solution (NaCl 9g KCl 0.42 g - $Cl_2Ca$ 0.24 g- dextrose 1.0 g - $CO_3HNa$ 0.5 g distilled water q.s. 1,000 cc.) at 37° C.

In studying the action of the despecified freeze-dried heart extract, there was observed a regularization of the cardiac rhythm, a strengthening of the systole, a prolongation of the diastole and an increase in the blood flow.

The product shows an inotropic and tonotropic activity.

The heart extract has proven useful in conditions stemming from cardiovascular diseases of senescence. Dosage.

One ampoule containing 200 mg. of the heart extract per day for 1 month by intramuscular injection.

In practice, use is preferably made of the product in the form of a solution which can be injected and which has, for example, the following formula, given for one ampoule :

Heart extract . . . . . . . . . . 200 mg,
Solvent (at time of use) . . . . 5 ml.

The solvent used is apyrogenic distilled water.

Treatments applied to 40 patients suffering from cardiovascular senescence troubles made it possible to ascertain :

the innocuity and good tolerance of the product for patients subjected to an anti-coagulant treatment.

the existence of electrocardiographic modifications of favorable aspect, coinciding with a functional improvement.

a vasodilatation action, chiefly coronary, a manifest cardiotonic and arteriocapillar action, with increase of diuresis.

Effectiveness of this treatment is thus proved.

As free fatty acids represent the main source of myocarditic energy, a statistical survey has been made on the fatty acids in the myocarditic metabolism; this survey approves the treatment used, the difference being highly significant : there is less than one chance in 1,000 that a similar effect was due to chance.

I claim:

1. A process for the preparation of extracts of the heart, useful in opotherapy, which comprises the steps:
   a. collecting the heart aseptically immediately upon slaughtering the animal;
   b. removing from said heart foreign matter, debris and fat;
   c. freezing the heart by immediately placing said heart in a medium at a temperature of about −78° C. and then maintaining the heart at a temperature of about −20° C.;
   d. crushing the heart at a temperature of about 2° C.;
   e. subjecting the crushed heart to moderate digestion at room temperature by activated trypsin;
   f. removing insoluble matter from the resulting material to leave a clear solution;
   g. removing euglobulins present in said solution by affixing on an insoluble sulfate;

h. removing the insoluble sulfate and clarifying the resulting solution; and i. freeze drying said clarified solution by immediately placing it in a medium at a temperature of about −80° C.

2. A process according to claim 1 wherein step (g) is carried out by:
   a. lowering the pH of the clarified solution to about 3.7 by the addition of sulfuric acid;
   b. raising the pH of the solution to about 9 by adding an alkaline earth hydroxide selected from the group consisting of calcium and barium hydroxides; and
   c. lowering the pH to about 3.7 by the addition of sulfuric acid.

3. A process according to claim 2 wherein the trypsin is activated with calcium ions.

4. A process for the preparation of extracts of the liver, useful in opotherapy, which comprises the steps:
   a. collecting the liver aseptically immediately upon slaughtering the animal;
   b. removing from said liver foreign matter, debris and fat;
   c. freezing the liver by immediately placing said liver in a medium at a temperature of about −78° C. and then maintaining the liver at a temperature of about −20° C.;
   d. crushing the liver at a temperature of about 2° C.;
   e. subjecting the crushed liver to moderate digestion at room temperature by activated trypsin;
   f. removing insoluble matter from the resulting material to leave a clear solution;
   g. removing euglobulins present in said solution by affixing on an insoluble sulfate;
   h. removing the insoluble sulfate and clarifying the resulting solution; and
   i. freeze drying said clarified solution by immediately placing it in a medium at a temperature of about −80° C.

5. A process according to claim 4 wherein step (g) is carried out by:
   a. lowering the pH of the clarified solution to about 3.7 by the addition of sulfuric acid;
   b. raising the pH of the solution to about 9 by adding an alkaline earth hydroxide selected from the group consisting of calcium and barium hydroxides; and
   c. lowering the pH to about 3.7 by the addition of sulfuric acid.

6. A process according to claim 5 wherein the trypsin is activated with calcium ions.

7. A process for the preparation of extracts of the kidney, useful in opotherapy, which comprises the steps:
   a. collecting the kidney aseptically immediately upon slaughtering the animal;
   b. removing from said kidney foreign matter, debris and fat;
   c. freezing the kidney by immediately placing said kidney in a medium at a temperature of about −78° C. and then maintaining the kidney at a temperature of about −20° C.;
   d. crushing the kidney at a temperature of about 2° C.;
   e. subjecting the crushed kidney to moderate digestion at room temperature by activated trypsin;
   f. removing insoluble matter from the resulting material to leave a clear solution;
   g. removing euglobulins present in said solution by affixing on an insoluble sulfate;
   h. removing the insoluble sulfate and clarifying the resulting solution; and
   i. freeze drying said clarified solution by immediately placing it in a medium at a temperature of about −80° C.

8. A process according to claim 7 wherein step (g) is carried out by:
   a. lowering the pH of the clarified solution to about 3.7 by the addition of sulfuric acid;
   b. raising the pH of the solution to about 9 by adding an alkaline earth hydroxide selected from the group consisting of calcium and barium hydroxides; and
   c. lowering the pH to about 3.7 by the addition of sulfuric acid.

9. A process according to claim 8 wherein the trypsin is activated with calcium ions.

* * * * *